Figure 1:
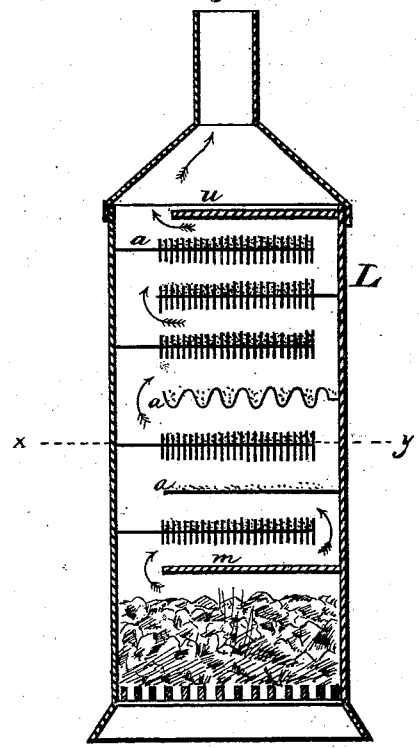

(No Model.)

C. F. BRUSH.
SECONDARY BATTERY.

No. 261,512. Patented July 18, 1882.

=Case F.=

WITNESSES
Ernest O. Orsburn.
Jno. Crowell Jr.

INVENTOR
Charles F. Brush
By Leggett & Leggett
ATTORNEYS (No Model.)
C. F. BRUSH.
SECONDARY BATTERY.
No. 261,512. Patented July 18, 1882.
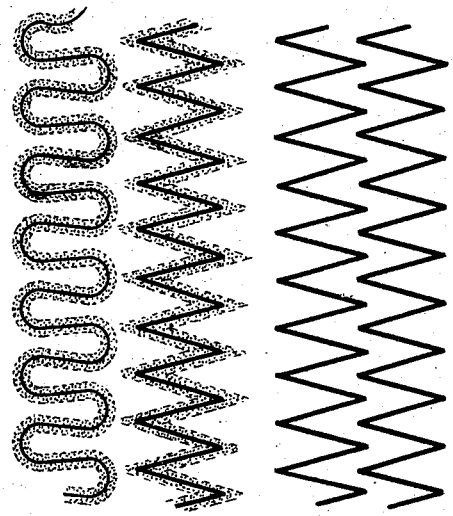  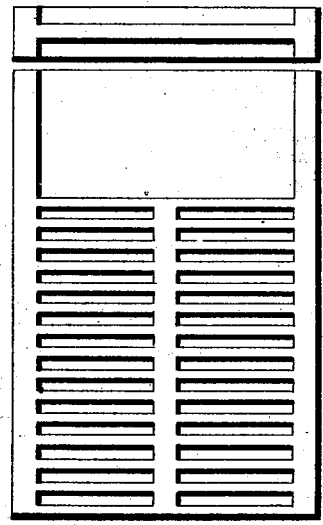 
Fig. 3. Fig. 4. Fig. 5. Fig. 6. Fig. 7. Fig. 8.
Fig. 9.
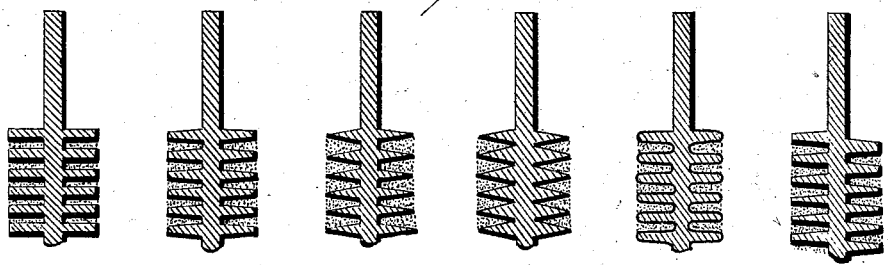
Fig. 10. Fig. 11. Fig. 12.
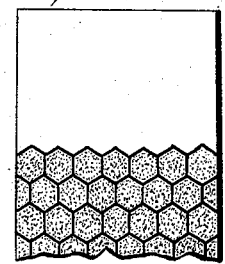 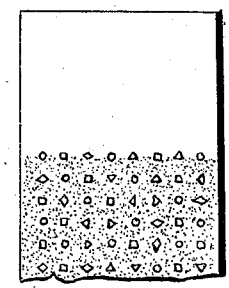 
WITNESSES
F. H. Nottingham
A. M. Bright
INVENTOR
Charles F. Brush
By Lazzato & Lazzato
Attorneys
N. PETERS, Photo-Lithographer, Washington, D. C.

UNITED STATES PATENT OFFICE.

CHARLES F. BRUSH, OF CLEVELAND, OHIO.

SECONDARY BATTERY.

SPECIFICATION forming part of Letters Patent No. 261,512, dated July 18, 1882.

Application filed June 9, 1881. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use it, reference being had to the accompanying drawings, which form part of this specification.

My invention relates to secondary batteries; and it consists in primarily providing the plates or elements of which such apparatus is made with a coating or filling of porous metal reduced from the oxide, or any suitable compound thereof, through the agency of a hot atmosphere of any suitable reducing gas or gases, and at a temperature insufficient to fuse the reduced metal.

In preparing or coating plates according to my invention porous lead may be reduced thereon from an oxide of the metal by means of an atmosphere or current of carbonic oxide or hydrogen at a temperature insufficient to fuse the reduced lead. Either of the gases mentioned will do this readily, and they may be used pure or mixed together or with any neutral gas, such as nitrogen. The plates, having been cleaned, are placed in a horizontal position and covered to a sufficient depth with the lead oxide. This may be applied dry, or, preferably, in the form of a paste, with water or with some liquid—such as nitric acid—which partially dissolves the oxide, and when evaporated leaves the latter in a coherent, compact condition. Solution of nitrate of lead may be used directly to form the paste. The oxide of lead may be fused before use, if found desirable, and applied either as a coarse or fine powder, or mixture of both. A lead plate, having been thickly sprinkled with coarsely-pulverized lead oxide, may have the latter securely embedded in its surface by means of a parallel plate of iron applied with hydraulic pressure or otherwise. Not only plain plates of electro-conducting material, but corrugated, cellular, perforated, ribbed or studded, or equivalent plates, may be employed to support and retain the lead oxide and the subsequently-reduced metal. The lead oxide may be fused and poured in a thin layer over the plates, chilling thereon before fusing of the plates takes place; or the corrugations or other cavities of the plates may be filled with the fused oxide. When plates other than lead are employed—such as gold or platinum—they may be dipped into the fused oxide, and when withdrawn will retain a coating thereof. Previous to the application of the coating of lead oxide the plates may receive a preliminary coating of oxide by treatment with a current of electricity in a charging-battery. This preliminary coating will assist in attaching the principal coating and the subsequently-reduced metal firmly to the plate. After the plates are coated with oxide they are packed, sufficiently separated from each other, in a suitable vessel or chamber, where they may be raised to a sufficiently high temperature and exposed for a sufficient length of time to the action of a reducing-gas.

Figure 2:
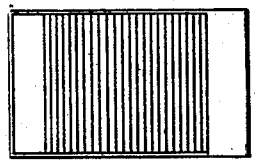

In the drawings, Figure 1 is a diagram illustrating a convenient method of treating the plates to a stream of carbonic oxide, mixed with nitrogen and hydrogen, if desired. Fig. 2 shows a cross-section of the apparatus in Fig. 1 through the line $x y$. Fig. 3 is an edge view of a corrugated plate coated in accordance with my invention. Fig. 4 shows an angularly-corrugated plate. Fig. 5 shows two angularly-corrugated plates having their folds entering each other. Fig. 6 represents a vertical section of a ribbed plate. Fig. 7 is a top and plan view of a ribbed plate. Fig. 8 is a vertical section of a perforated or slotted plate. Fig. 9 shows several different forms of ribbed plates. Fig. 10 represents a honey-comb plate; Fig. 11, a studded plate; and Fig. 12 shows a ribbed corrugated plate.

In Fig. 1, L is a chamber, of sheet-iron, having a cross-section slightly wider than a plate to be treated, and considerably longer, as shown in Fig. 2. The chamber is provided at the top with a chimney and at the bottom with a grate supporting a thick layer of ignited charcoal or coke, all as shown. *a a a* are plates to be treated, coated on the upper side with oxide of lead, and supported at a sufficient distance from each other by ribs (not shown) attached to the sides of the chamber. The plates are arranged so as to leave openings at alternate sides of the chamber, as shown, in order to direct the current of gases from the fire across the faces of the plates.

$m$ is a plate of metal or slate, to properly direct the gases from the fire and protect the lead plates from the direct heat thereof.

$u$ is a similar plate, to confine and direct the gases over the top lead plate and prevent too great radiation of heat therefrom.

The operation of the apparatus is obvious: Air in passing upward through the thick bed of incandescent fuel has its oxygen converted into carbonic oxide, and the hot carbonic oxide and nitrogen pass upward between the plates, thereby heating them and gradually reducing the oxide of lead to the metallic state. The gases finally escape at the chimney. If steam is introduced with the air, hydrogen gas is also formed.

Obviously many forms of apparatus other than the one I have shown may be employed to effect the reduction of the lead oxide.

The coating of porous metal I have described as applied to the plates of secondary batteries possesses properties differing from those of either spongy lead or electrically-deposited coherent lead. It may be regarded as intermediate in character between the two.

When corrugated, cellular, perforated, or equivalent plates are treated, the cavities therein may be entirely filled with the porous metal. Secondary-battery plates, coated or combined with porous lead, as above specified, may be associated together and charged at once for use, whereby the porous metal on one of them is peroxidized, while that of the opposed plate or plates absorbs hydrogen. Better results are produced, however, by first peroxidizing all of the plates and then reversing the charge in half of them, thus reducing their peroxide to the metallic state and forming hydrogen elements of greater efficiency than before. Frequent reversals of charge, as is customary in the ordinary "forming" process, should be avoided.

Having fully described my invention, what I claim as new, and desire to secure by Letters Patent, is—

The herein-described process or method of coating or combining lead or other plates with reduced porous lead, said process consisting in coating the said plates with a suitable compound of lead, and then reducing the latter to the metallic state in the dry way by means of a reducing atmosphere, substantially as set forth.

In testimony whereof I have signed my name to this specification in the presence of two subscribing witnesses.

CHARLES F. BRUSH.

Witnesses:
JNO. CROWELL, Jr.,
ERNEST O. ORSBURN.